(12) United States Patent
Vanlooy, Jr. et al.

(10) Patent No.: US 10,093,257 B2
(45) Date of Patent: Oct. 9, 2018

(54) BUMPER FASCIA ADJUSTMENT MECHANISM

(71) Applicant: Calsonic Kansei North America, Inc., Farmington Hills, MI (US)

(72) Inventors: David Peter Vanlooy, Jr., Redford, MI (US); Victor Kenneth Sanders, Garden City, MI (US)

(73) Assignee: CALSONIC KANSEI NORTH AMERICA, INC., Farmington Hills, MI (US)

( * ) Notice: Subject to any disclaimer, the term of this patent is extended or adjusted under 35 U.S.C. 154(b) by 162 days.

(21) Appl. No.: 15/297,781

(22) Filed: Oct. 19, 2016

(65) Prior Publication Data

US 2018/0105130 A1    Apr. 19, 2018

(51) Int. Cl.
*B60R 19/38*    (2006.01)
*B60R 19/18*    (2006.01)

(52) U.S. Cl.
CPC ...... *B60R 19/38* (2013.01); *B60R 2019/1886* (2013.01)

(58) Field of Classification Search
CPC .................................................. B60R 19/38
USPC ........................................................ 293/102
See application file for complete search history.

(56) References Cited

U.S. PATENT DOCUMENTS

2009/0218834 A1*  9/2009  Huber ................. B60Q 1/0433
                                                        293/155
2014/0167454 A1   6/2014  Clapie et al.

\* cited by examiner

*Primary Examiner* — Joseph D. Pape
(74) *Attorney, Agent, or Firm* — Foley & Lardner LLP

(57) ABSTRACT

An adjustment mechanism for a fascia of a vehicle includes a riser having an upper end defining a hole and a fascia retainer defining a first threaded bore in a center portion thereof. The adjustment mechanism further includes an externally threaded sleeve received in the first threaded bore, the sleeve defining a lower end configured to engage the upper end of the riser, and a bolt extending through a sleeve bore defined in the sleeve and into the hole in the upper end of the riser. The bolt is threadably coupled to the upper end of the riser.

24 Claims, 5 Drawing Sheets

BUMPER FASCIA ADJUSTMENT MECHANISM

BACKGROUND

The present application relates generally to the field of mechanisms for adjusting a bumper fascia for a vehicle. Specifically, the present application relates to mechanisms for adjusting vertical position of the center of the fascia without removing the fascia from the vehicle.

When a vehicle is being assembled, adjustment points may be included to allow for repositioning panels of the vehicle to provide consistent gaps (i.e., panel gaps) between adjacent panels. Conventionally, the adjustment points are concealed behind the panel and are thus inaccessible when the panel is installed on the vehicle. For example, when the panel is installed on the vehicle and a person assembling the vehicle checks the size of the gaps, the panel must be removed from the vehicle to adjust the gaps, after which the panel is reinstalled on the vehicle. This process is repeated until the gaps surrounding the panel are within a desired tolerance. The labor involved with removing and reinstalling the panel for every adjustment attempt increases both the cost and the time involved with assembling a vehicle. Further, because adjustments can only be made with the panel removed from the vehicle, the adjustments cannot be made with an optimal level of precision.

SUMMARY

One embodiment relates to an adjustment mechanism for a fascia of a vehicle including, a riser having an upper end defining a hole and a fascia retainer defining a first threaded bore in a center portion thereof. The adjustment mechanism further includes an externally threaded sleeve received in the first threaded bore, the sleeve defining a lower end configured to engage the upper end of the riser, and a bolt extending through a sleeve bore defined in the sleeve and into the hole in the upper end of the riser. The bolt is threadably coupled to the upper end of the riser.

Another embodiment relates to an adjustable fascia assembly, including a first adjustment mechanism including a riser having an upper end defining a hole and a fascia retainer defining a first threaded bore in a center portion thereof. The first adjustment mechanism further includes an externally threaded sleeve received in the first threaded bore, the sleeve defining a lower end configured to engage the upper end of the riser, and a bolt extending through a sleeve bore defined in the sleeve and into the hole in the upper end of the riser. The bolt is threadably coupled to the upper end of the riser. The fascia assembly further includes a cover disposed on an upper surface of the fascia retainer, the cover defining an opening proximate the bolt and the sleeve, such that the bolt and the sleeve are accessible through the opening, and a fascia coupled to the fascia retainer.

Another embodiment relates to a method of adjusting a center portion of a fascia for a vehicle, including taking a first gap measurement between an upper end of the fascia and a hood of the vehicle at a center portion of the fascia, taking a second gap measurement between the fascia and the hood at a location proximate a side of the fascia, and comparing the first gap measurement and the second gap measurement. The method further includes articulating a sleeve configured to adjust a vertical position of the center portion of the fascia, until the first and second gap measurements are substantially the same. A position of the side of the fascia is substantially fixed.

DETAILED DESCRIPTION

Referring to the FIGURES generally, an adjustable vehicle fascia assembly is shown according to an exemplary embodiment. The fascia assembly is configured to adjust a vertical position of a center portion of the fascia to provide a desired panel gap between the fascia and a hood, as described herein, although it should be understood by those reviewing the present description that such adjustment mechanisms may be applicable to other types of vehicle adjustments.

Figure 1:
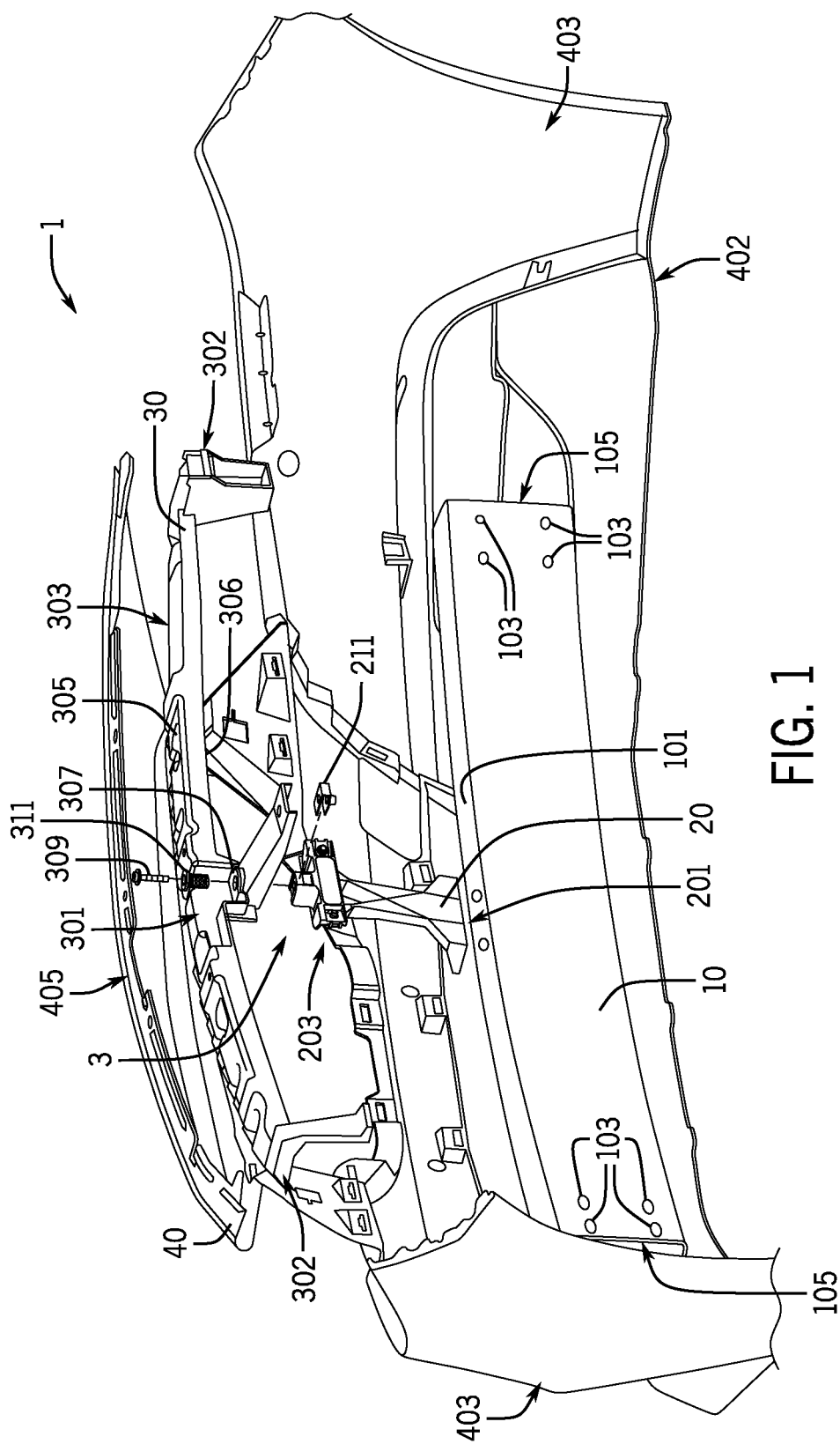
FIG. 1 is an exploded rear perspective view of a fascia assembly, according to an exemplary embodiment.

Referring to FIG. 1, an exploded view of a fascia assembly 1 for installation on a bumper beam 10 of a vehicle is shown according to an exemplary embodiment. The fascia assembly 1 includes a riser 20 extending upward from an upper surface 101 of the bumper beam 10. A fascia retainer 30 is adjustably coupled to the riser 20, such that a height of a center portion 301 of the fascia retainer 30 is adjustable relative to the bumper beam 10 and/or a hood (not shown) of a vehicle. A fascia 40 is coupled to and extends from a forward edge 303 of the fascia retainer 30 and downward therefrom such that the fascia 40 conceals (i.e., covers, obscures, etc.) at least a portion of the bumper beam 10. A cover 50 is disposed on at least an upper surface 305 of the fascia retainer 30, such that when a person lifts (i.e., raises) the hood of the vehicle, substantially all of the fascia retainer 30 is concealed from view.

The bumper beam 10 forms a structural component of a vehicle frame that is configured to absorb forces during impact and to provide structural rigidity to the rest of the vehicle frame. The bumper beam 10 may be joined (e.g., welded, bolted, riveted, glued, etc.) to the vehicle frame with a plurality of mounting points 103 disposed proximate each end 105 of the bumper beam 10. A crush box (not shown) is coupled to a forward surface of the bumper beam 10. The crush box is disposed between the bumper beam 10 and the fascia 40 and is configured to absorb forces during an impact. The crush box may be formed from plastic, foam, or other deformable material that is advantageously configured to deform upon impact.

Figure 2:
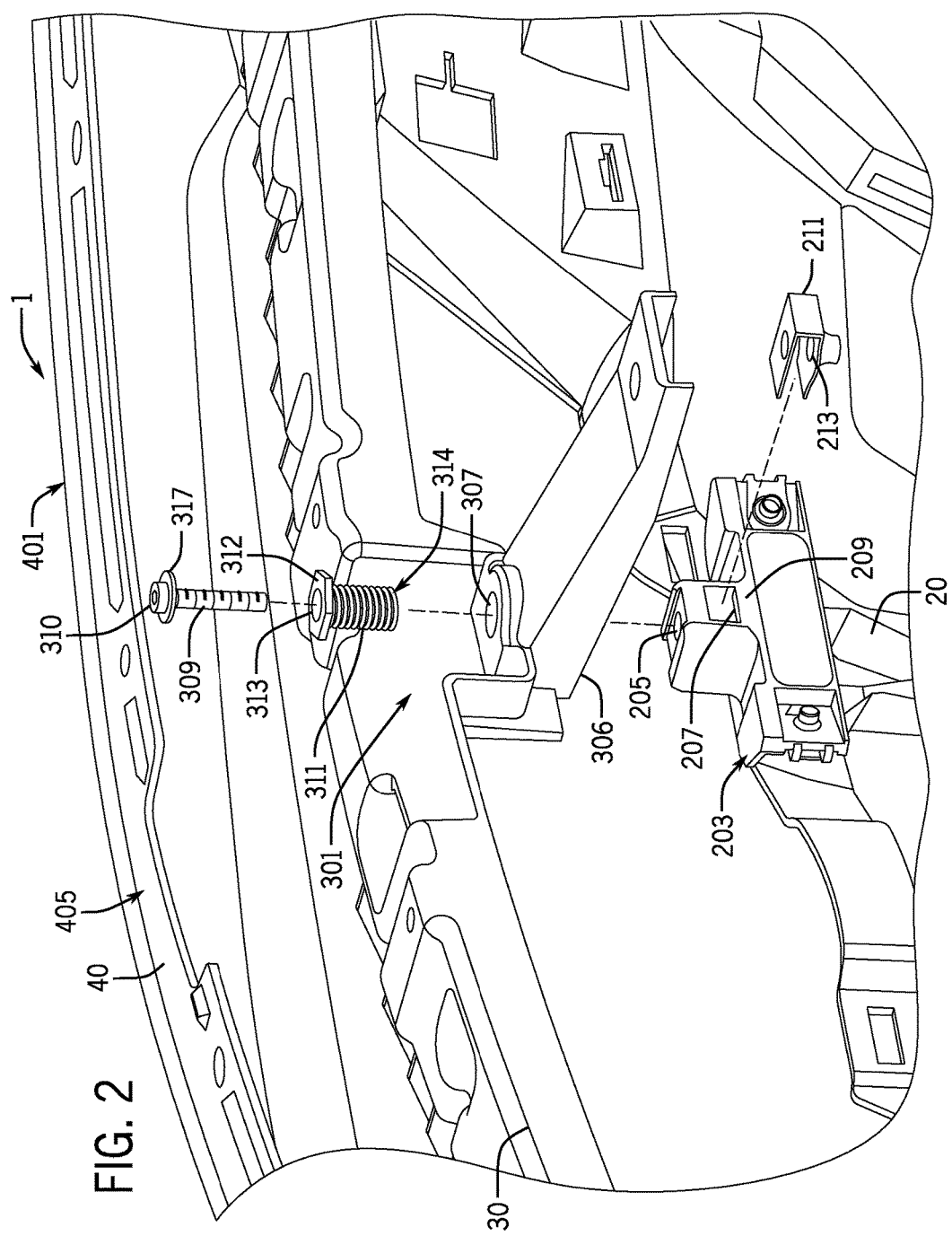
FIG. 2 is a close-up detailed view of FIG. 1.

The riser 20 includes a lower end 201 and an opposing upper end 203. The lower end 201 is coupled (e.g., bolted, riveted, welded, glued, etc.) to the upper surface 101 of the bumper beam 10 at a central portion thereof. For example, the riser 20 is substantially centered between the ends 105 of the bumper beam 10. As shown in FIG. 1, the bumper beam 10 may define a plurality of holes or openings 107 in the upper surface 101. A fastener (not shown) may be used to couple the riser 20 to each of the holes 107. Referring now to FIG. 2, the upper end 203 of the riser 20 defines a hole 205 having a first diameter extending therethrough. A slot 207 is defined in a side 209 of the riser 20 at the upper end 203 thereof and is configured to receive a clip 211 therein. The slot 207 is substantially perpendicular to the hole 205. The clip 211 has legs defining a generally "U" shape and a bore 213 (i.e., clip bore) extending through each leg. When the clip 211 is installed in the riser 20, at least one leg is received in the slot 207 and the bore 213 is substantially coaxial with the hole 205 of the riser 20. The bore 213 is threaded and is configured to threadably engage a bolt 309. According to another exemplary embodiment, the hole 205 may be threaded and configured to threadably engage the bolt 309 without the clip 211. The riser 20 may be formed from plastic, carbon fiber, metal, or any other suitable material configured to support the weight of the fascia 40. According to an exemplary embodiment, the riser 20 may be integrally formed with the bumper beam 10. According to another exemplary embodiment, the fascia retainer 30 may be coupled to the bumper beam 10 without the riser 20 disposed therebetween. In this configuration, the slot 207 and hole 205 may be defined in the bumper beam 10 or another structure of the vehicle.

Figure 3:
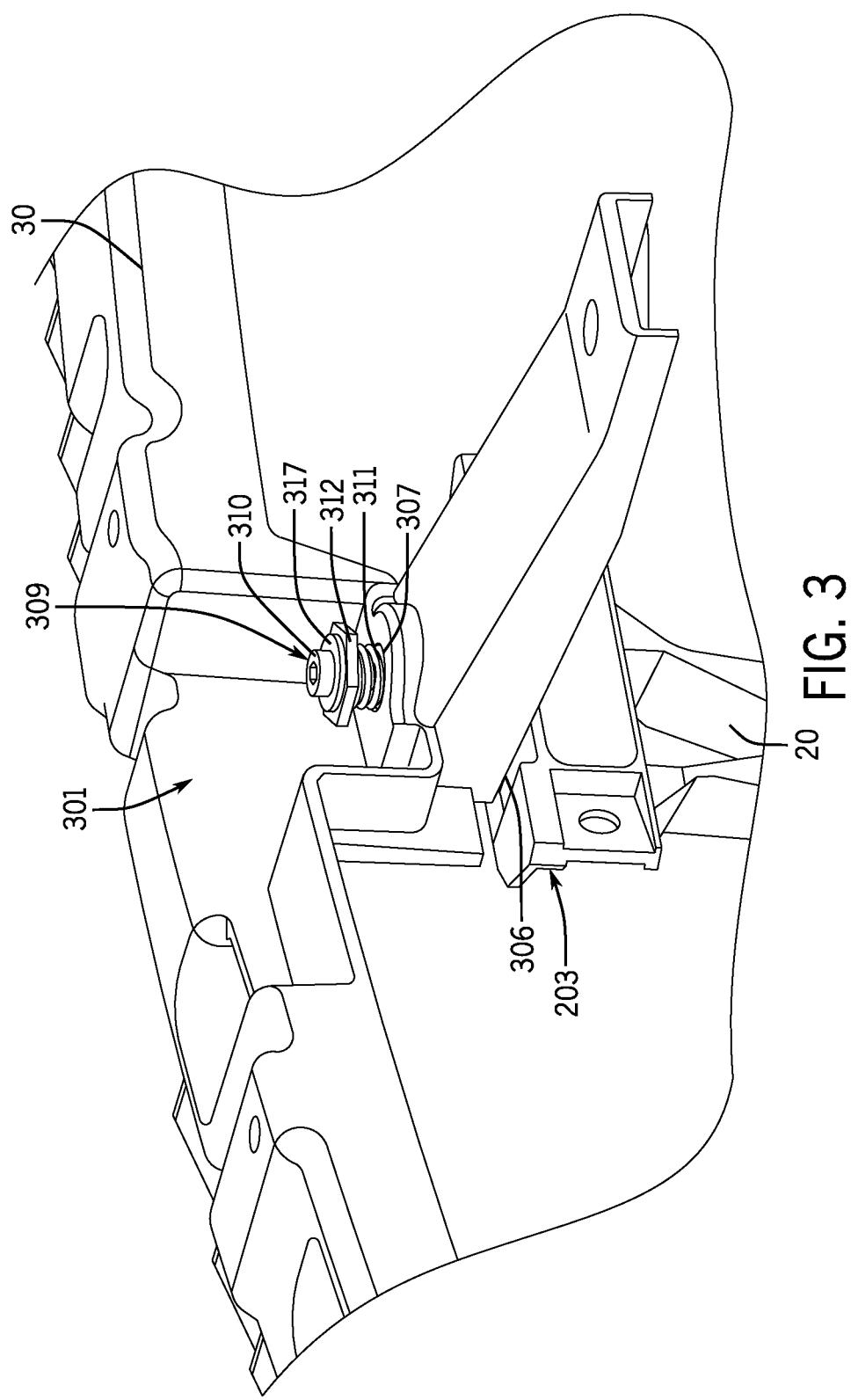
FIG. 3 is a rear perspective view of a fascia adjustment mechanism, according to an exemplary embodiment.

Referring to FIGS. 2 and 3, an adjustment mechanism 3 is shown according to an exemplary embodiment. The adjustment mechanism 3 includes the fascia retainer 30 and the fastener such as a bolt 309 that is received in the sleeve 311. As shown in FIG. 2, the fascia retainer 30 defines a bore 307 (i.e., fascia bore) extending therethrough from the upper surface 305 of the fascia retainer 30 toward the riser 20. The bore 307 is configured to receive an externally threaded sleeve 311. The bore 307 of the fascia retainer 30 is internally threaded and configured to threadably engage the sleeve 311. The threading on the bolt 309 may be substantially more fine than the threads on the sleeve 311, such that the center portion 301 of the fascia retainer 30 is configured to raise and lower with less rotation of the sleeve 311.

Referring to FIG. 3, the bolt 309 is received in a bore 313 (i.e., sleeve bore) defining a second diameter greater than the first diameter and extending axially through the sleeve 311. A washer 317 may be disposed axially about the bolt 309 and between a head 310 of the bolt 309 and a head 312 of the sleeve 311. When installed in the sleeve bore 313, the bolt 309 extends fully through the sleeve bore 313, such that a lower threaded portion 315 of the bolt 309 is configured to threadably engage the bore 213 of the clip 211 installed in the upper end 207 of the riser 20. While FIG. 3 shows the bolt 309 configured to receive a hex key, the bolt 309 may include other types of fasteners configured to threadably engage the bore 213 of the clip 211.

When the bolt 309 is received in the bore 313, the bolt 309 is not securely coupled directly to the sleeve 311. For example, the first diameter may be substantially less than the second diameter, such that the bolt 309 is configured to move laterally within the bore 313 of the sleeve 311. Where the diameter of the bolt 309 is substantially less than the diameter of the bore 313, the fascia retainer 30 and therefore the fascia 40 is free to move laterally relative to the riser 20 and/or the bumper beam 10, within a specified tolerance. The tolerance may be determined based on the difference between first and second diameters. In this configuration, the fascia retainer 30 may move laterally at least as far as the center portion 301 of the fascia retainer 30 is configured to move. Where the fascia 40 is subject to position adjustments in more than one direction, the fascia 40 becomes more likely to fail (e.g., crack). However, free lateral movement of the fascia 40 reduces the likelihood of such failures because only movement in one direction (e.g., vertical) is being adjusted and fixed by the fascia assembly 1.

Figure 5:
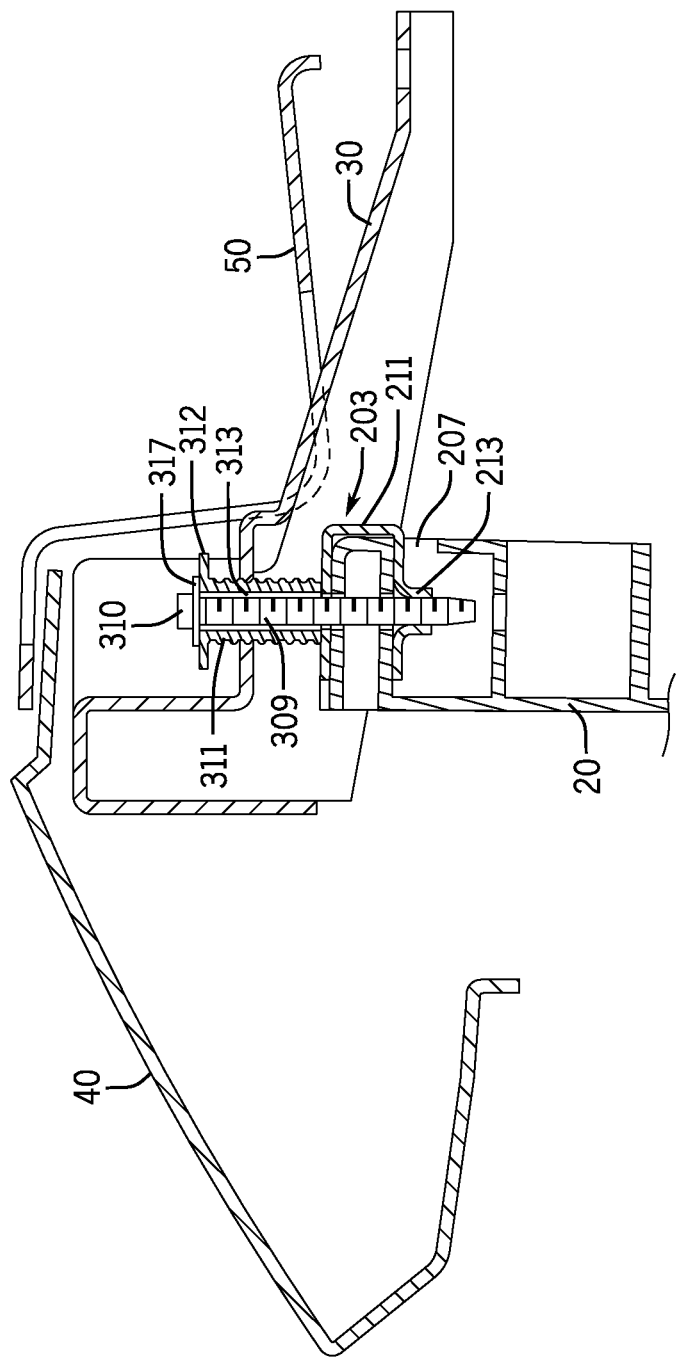
FIG. 5 is a cross-section view of the fascia assembly taken along line 5-5 in FIG. 4.

Referring to FIG. 5, the adjustment mechanism 3 for moving the center portion 301 of the fascia retainer 30 relative to the riser 20 is shown according to an exemplary embodiment. The sleeve 311 extends fully through the bore 307 of the fascia retainer 30, such that a lower end 314 of the sleeve 311 is disposed past (i.e., below) a lower surface 306 of the fascia retainer 30. The lower end 314 of the sleeve 311 engages the upper end 203 of the riser 20 or other structure in which the bolt 309 is threadably received.

The fascia retainer 30 includes opposing ends 302 (i.e., sides), configured to couple the fascia retainer 30 to another structure in the vehicle. For example, the ends 302 may be coupled to the vehicle frame, a radiator cross-support, or other structural member. In this configuration, the ends 302 are fixed relative to the vehicle and other panels and do not move when the center portion 301 of the retainer member 30 is adjusted. As the sleeve 311 is tightened or further threaded into the bore 307, the center portion 301 of the fascia retainer 30 is raised (i.e., further offset) from the upper end 203 of the riser 20. Similarly, as the sleeve 311 is loosened, or partially withdrawn from the bore 307, the center portion 301 of the fascia retainer 30 is lowered (i.e., brought closer to) the upper end 203 of the riser 20. The fascia retainer 30 may be formed from a plastic, composite, or other semi-flexible material. The material forming the fascia retainer 30 is configured to be flexible enough such that when the center portion 301 is raised and lowered, the fascia retainer 30 flexes (i.e., bends) between the center portion 301 and the ends 302 without breaking (e.g., cracking, shattering, etc.).

Referring to FIG. 1, the fascia 40 defines an upper end 401, a lower end 402, and opposing sides 403. Each side 403 may be configured to be coupled to a quarter panel (not shown) or other structure of the vehicle. The upper end 401 of the fascia 40 is coupled to the upper surface 305 of the fascia retainer 30. The fascia 40 may be coupled to the fascia retainer 30 at a plurality of points along the upper surface 305, including, for example, at the center portion 301 of the fascia retainer 30. In this configuration, deflection of the upper end 401 of the fascia is configured to correspond directly with the deflection of the fascia retainer 30. By using the adjustment mechanism 3, panel gaps defined by the upper end 401 of the fascia 40 may be substantially fixed proximate the sides 403 and may be adjustable at a central portion 405 of the fascia 40. The vertical position of the central portion 405 may be adjusted using the adjustment mechanism 3 in order to provide a panel gap at the central portion 405 that is substantially the same as the panel gaps proximate the sides 403.

During general assembly of the vehicle, the fascia assembly 1 is coupled to the vehicle frame. For example, the bumper beam 10 may be formed as an integral component of the vehicle frame and the fascia assembly 1 may be joined to the frame by coupling the lower end 201 of the riser 20 to the bumper beam 10. Once the fascia assembly 1 is installed, the vehicle hood is lowered (i.e., closed). A first gap measurement is taken between the upper end 401 of the fascia 40 and the hood at the center portion 405 of the fascia 40. A second gap measurement is taken between the fascia 40 and the hood proximate at least one of the sides 403. The first gap measurement is compared with the second gap measurement and the direction of adjustment of the center portion 405 of the fascia 40 is determined.

The hood is then raised on the vehicle and the bolt 309 is loosened. The sleeve 311 is then rotated in the bore 307 of the fascia retainer 30 until the center portion 405 is at a desired height. The hood is then lowered again and the first and second gap measurements are retaken. If the first and second gap measurements are not substantially the same (e.g., within a desired tolerance), the adjustment process is repeated until the first and second gap measurements are substantially the same. When the first and second gap measurements are substantially the same, the bolt 309 is tightened, holding the sleeve 311 rotationally fixed in the bore 307 of the fascia retainer 30.

Where the first gap measurement is greater than the second gap measurement, the center portion 405 of the fascia 40 is too low and should be raised. In order to raise the center portion 405, the sleeve 311 is tightened (i.e., engaged, rotated clockwise, threaded further into the bore 307). In contrast, where the first gap measurement is less than the second gap measurement, the center portion 405 of the fascia 40 is too high and should be lowered. In order to lower the center portion 405, the sleeve 311 is loosened (i.e., disengaged, rotated counter-clockwise, partially withdrawn from the bore 307).

Once the fascia 40 is in a desired position relative to other body panels (e.g., the hood, etc.), the bolt 309 is tightened in the bore 213 of the clip 211. When the bolt 309 is tightened, the head 310 of the bolt 309 engages the head 312 of the sleeve 311, increasing the normal force applied between the lower end 314 of the sleeve 311 and the upper end 203 of the riser 20. The normal force increases the static frictional resistance between the lower end 314 of the sleeve 311 and the upper end 203 of the riser 20, preventing the sleeve 311 from rotating within the bore 307 of the fascia retainer 30 and holding the fascia retainer 30 at a fixed height (i.e., offset) relative to the riser 20.

Figure 4:
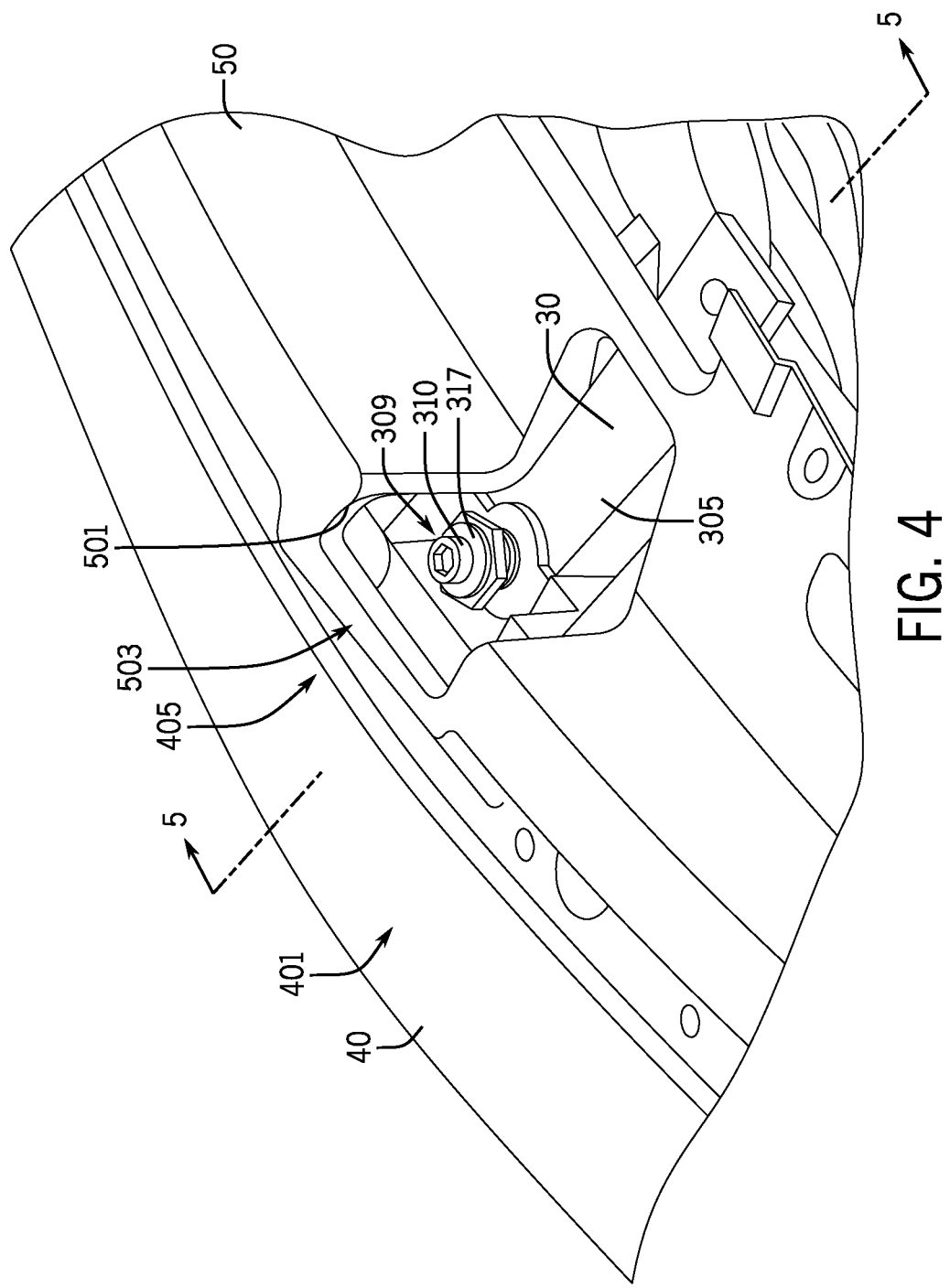
FIG. 4 is a rear perspective view of a fascia assembly, showing the fascia adjustment mechanism, according to an exemplary embodiment.

Referring to FIG. 4, the cover 50 is shown according to an exemplary embodiment. The cover 50 is received by and coupled (e.g., bolted, riveted, glued, etc.) to the upper surface 305 of the fascia retainer 30. As shown in FIG. 5, the upper end 401 of the fascia 40 may be disposed (e.g., received) between the fascia retainer 30 and the cover 50. For example, the cover 50 may conceal an edge of the upper end 401 from view when installed. The cover 50 may be formed from molded plastic or other suitable material configured to correspond to a profile of the fascia retainer 30.

Referring to FIG. 4, an opening 501 (i.e., gap) is defined in a center portion 503 of the cover 50. The opening 501 is configured to provide access through the cover 50 to the bolt 309 and the sleeve 311, without removing the cover 50 or the fascia 40 from the vehicle. For example, the opening 501 may be positioned over the center portion 301 of the fascia retainer 30. According to another exemplary embodiment, where the bolt 309 and the sleeve 311 are located at a location in the fascia retainer 30 other than the center portion 301, the opening 501 is defined in another location in the cover 50 to provide access thereto.

A cap (not shown) may be received in the opening 501, such that the center portion 301 of the fascia retainer 30 is concealed from view when the hood is raised. For example, the cap may cover substantially the entire opening 501, concealing the bolt 309 and the sleeve 311 from view and from being adjusted. The cap may be removably received in the opening 501, such that the bolt 309 and the sleeve 311 may be accessed later to provide adjustment to the position of the fascia 40.

When the position of the fascia 40 is done being adjusted, the cap is installed in the opening 501, providing access for adjustment during assembly, but providing a desirable aesthetic appearance to a consumer. Advantageously, when a fascia assembly 1 is installed on a vehicle, the panel gap at the center portion 405 of the fascia 40 may be adjusted without removing the fascia from the vehicle. According to an exemplary embodiment, the cap is removably received in the opening 501, such that the position of the fascia 40 can be adjusted at a later time after assembly of the vehicle.

The position of various body panels (e.g., fascia hood, front quarter panel, door panel, etc.) may vary between different vehicles in an assembly line due to tolerances found in ordinary manufacturing and assembly processes. While the foregoing application describes adjusting a center portion 301 of the fascia retainer 30, the fascia retainer 30 may be used to adjust the position of other panels of a vehicle. For example, a panel other than the fascia 40 may be coupled to the fascia retainer 30 for adjustment relative to another panel. According to another exemplary embodiment, trim components (e.g., headlights, taillights, etc.) may be installed and adjusted with the adjustment mechanism 3.

According to an exemplary embodiment, a panel may be adjustable with more than one adjustment mechanism 3. Each adjustment mechanism 3 may include a bolt 309 and a sleeve 311. The adjustment mechanisms 3 may share a fascia retainer 30, which defines a separate bore 307 for each adjustment mechanism 3. For example, two or more adjustment mechanisms 3 may be spaced apart and coupled to the panel. Where more than one adjustment mechanism 3 is used to adjust a panel, the axes of the bores 307 extend substantially parallel to each other such that each adjustment mechanism 3 adjusts the fascia 40 in the same direction. In this configuration, each of the bolts 309 and the sleeves 311 are also substantially parallel. By orienting the adjustment mechanisms 3 parallel to each other, the likelihood of failure of the panel is reduced because the panel is not subject to increased loads in more than one direction.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of this disclosure as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the position of elements (e.g., "top," "bottom," "above," "below," etc.) are merely used to describe the orientation of various elements in the FIG- URES. It should be noted that the orientation of various elements may differ according to other exemplary embodiments, and that such variations are intended to be encompassed by the present disclosure.

It is to be understood that although the present invention has been described with regard to preferred embodiments thereof, various other embodiments and variants may occur to those skilled in the art, which are within the scope and spirit of the invention, and such other embodiments and variants are intended to be covered by corresponding claims. Those skilled in the art will readily appreciate that many modifications are possible (e.g., variations in sizes, structures, shapes and proportions of the various elements, mounting arrangements, use of materials, orientations, etc.) without materially departing from the novel teachings and advantages of the subject matter described herein. For example, the order or sequence of any process or method steps may be varied or re-sequenced according to alternative embodiments. Other substitutions, modifications, changes and omissions may also be made in the design, operating conditions and arrangement of the various exemplary embodiments without departing from the scope of the present disclosure.

What is claimed is:

1. An adjustment mechanism for a fascia of a vehicle comprising:
   a riser disposed on a bumper beam and having an upper end defining a hole;
   a fascia retainer defining a first threaded bore in a center portion thereof;
   an externally threaded sleeve received in the first threaded bore, the sleeve defining a lower end configured to engage the upper end of the riser; and
   a bolt extending through a sleeve bore defined in the sleeve and into the hole in the upper end of the riser;
   wherein the bolt is threadably coupled to the upper end of the riser.

2. The adjustment mechanism of claim 1, wherein a diameter of the sleeve bore is greater than a diameter of the bolt, such that the bolt is configured to move laterally within the sleeve bore.

3. The adjustment mechanism of claim 1, wherein the upper end of the riser is configured to receive a clip having a second threaded bore, the second threaded bore configured to receive and threadably engage the bolt.

4. The adjustment mechanism of claim 1, wherein the fascia retainer defines opposing ends configured to be fixed relative to a vehicle frame.

5. The adjustment mechanism of claim 4, wherein the center portion of the fascia retainer is vertically adjustable relative to the ends of the fascia retainer by articulating the sleeve.

6. The adjustment mechanism of claim 4, wherein the fascia retainer is formed from a material configured to flex between the center portion and the ends when the center portion is vertically adjusted.

7. The adjustment mechanism of claim 1, wherein the riser is disposed on a central portion of the bumper beam joined to a vehicle frame.

8. The adjustment mechanism of claim 1, wherein the fascia retainer defines opposing ends, each end coupled to another structure of the vehicle.

9. An adjustable fascia assembly comprising:
   a first adjustment mechanism comprising:
   a riser having an upper end defining a hole;
   a fascia retainer defining a first threaded bore in a center portion thereof;
   an externally threaded sleeve received in the first threaded bore, the sleeve defining a lower end configured to engage the upper end of the riser; and
   a bolt extending through a sleeve bore defined in the sleeve and into the hole in the upper end of the riser;
   wherein the bolt is threadably coupled to the upper end of the riser;
   a cover disposed on an upper surface of the fascia retainer, the cover defining an opening proximate the bolt and the sleeve, such that the bolt and the sleeve are accessible through the opening; and
   a fascia coupled to the fascia retainer.

10. The adjustment mechanism of claim 9, wherein a diameter of the sleeve bore is greater than a diameter of the bolt, such that the bolt is configured to move laterally within the sleeve bore.

11. The assembly of claim 9, wherein a lower end of the riser is coupled to a bumper beam forming a portion of a vehicle frame.

12. The assembly of claim 11, wherein the riser is disposed on a central portion of the bumper beam.

13. The assembly of claim 9, wherein the upper end of the fascia is disposed between the fascia retainer and the cover.

14. The assembly of claim 9, wherein a cap is removably received in the opening, such that the bolt and the sleeve are concealed by the cap and the cover.

15. The assembly of claim 9, further comprising a second adjustment mechanism having a sleeve substantially parallel to the sleeve of the first adjustment mechanism;
   wherein the first and second adjustment mechanisms share one fascia retainer.

16. The assembly of claim 15, each of the adjustment mechanisms are configured to adjust the fascia retainer in the same direction.

17. The adjustment mechanism of claim 9, wherein the fascia retainer defines opposing ends, each end coupled to another structure of a vehicle.

18. A method of adjusting a center portion of a fascia for a vehicle comprising:
   taking a first gap measurement between an upper end of the fascia and a hood of the vehicle at a center portion of the fascia;
   taking a second gap measurement between the fascia and the hood at a location proximate a side of the fascia;
   comparing the first gap measurement and the second gap measurement; and
   articulating an externally threaded sleeve configured to adjust a vertical position of the center portion of the fascia, until the first and second gap measurements are substantially the same;
   wherein a position of the side of the fascia is substantially fixed.

19. The method of claim 18 further comprising loosening a bolt disposed in a bore in the sleeve before articulating the sleeve.

20. The method of claim 18, wherein when the first gap measurement is greater than the second gap measurement, the center portion of the fascia is brought closer to the hood by threading the sleeve further into a bore in a fascia retainer.

21. The method of claim 18, wherein when the first gap measurement is less than the second gap measurement, the center portion of the fascia moved away from the hood by partially withdrawing the sleeve from a bore in a fascia retainer.

22. The method of claim 18 further comprising tightening a bolt within a bore of the sleeve such that a lower end of the sleeve frictionally engages a surface;

wherein the frictional engagement is configured to prevent the sleeve from rotating.

23. The method of claim 18, wherein the sleeve is accessible through an opening in a cover, such that the sleeve is articulated without removing the fascia from the vehicle.

24. The method of claim 23 further comprising covering the opening with a cap such that the sleeve is concealed beneath the cover and the cap.

* * * * *